Feb. 10, 1931.　　　　L. VEHON　　　　1,791,986
RUNWAY OR AUTOMOBILE WHEEL ELEVATOR
Filed Sept. 6, 1929　　　2 Sheets-Sheet 1
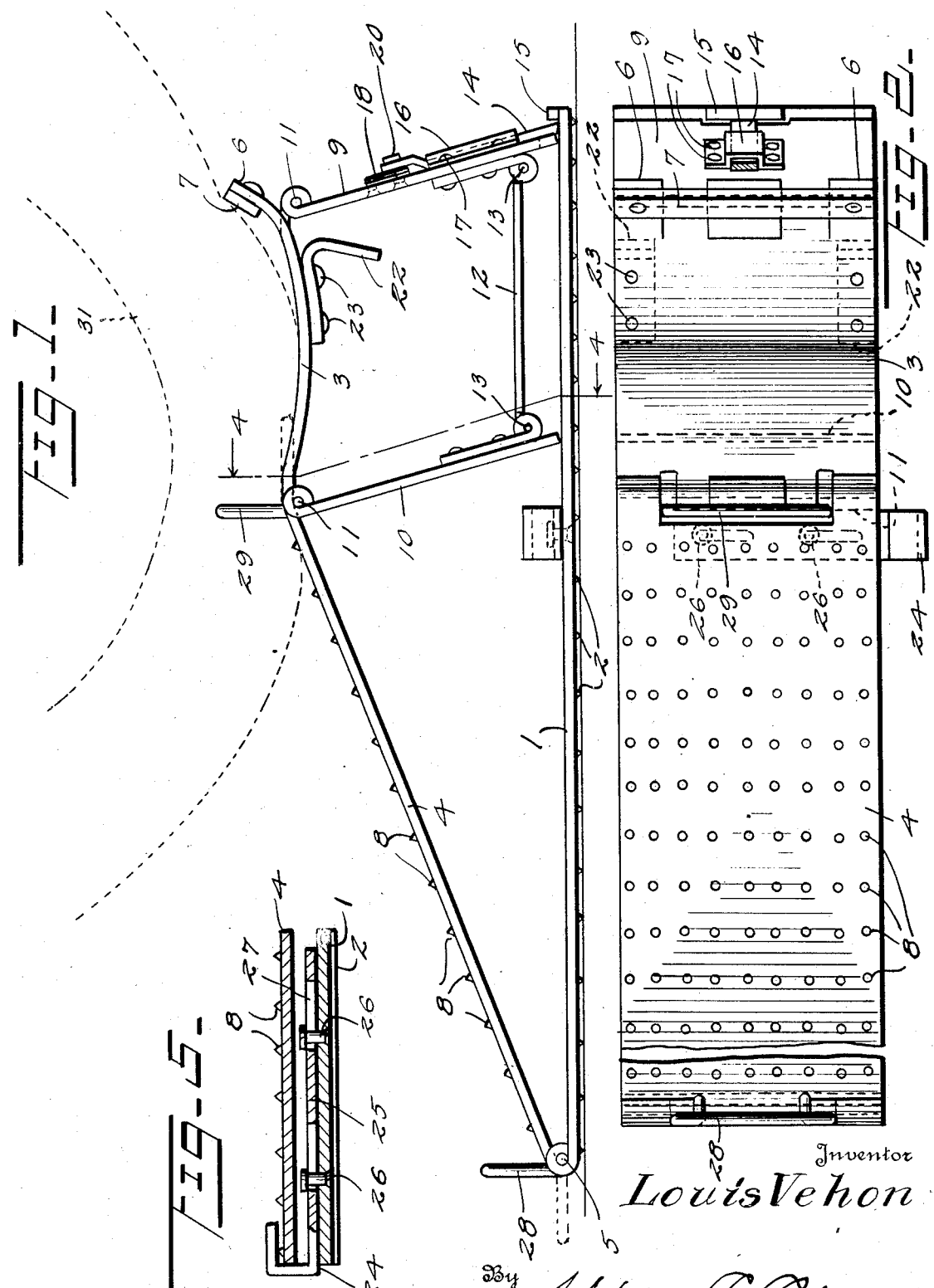
Inventor
Louis Vehon

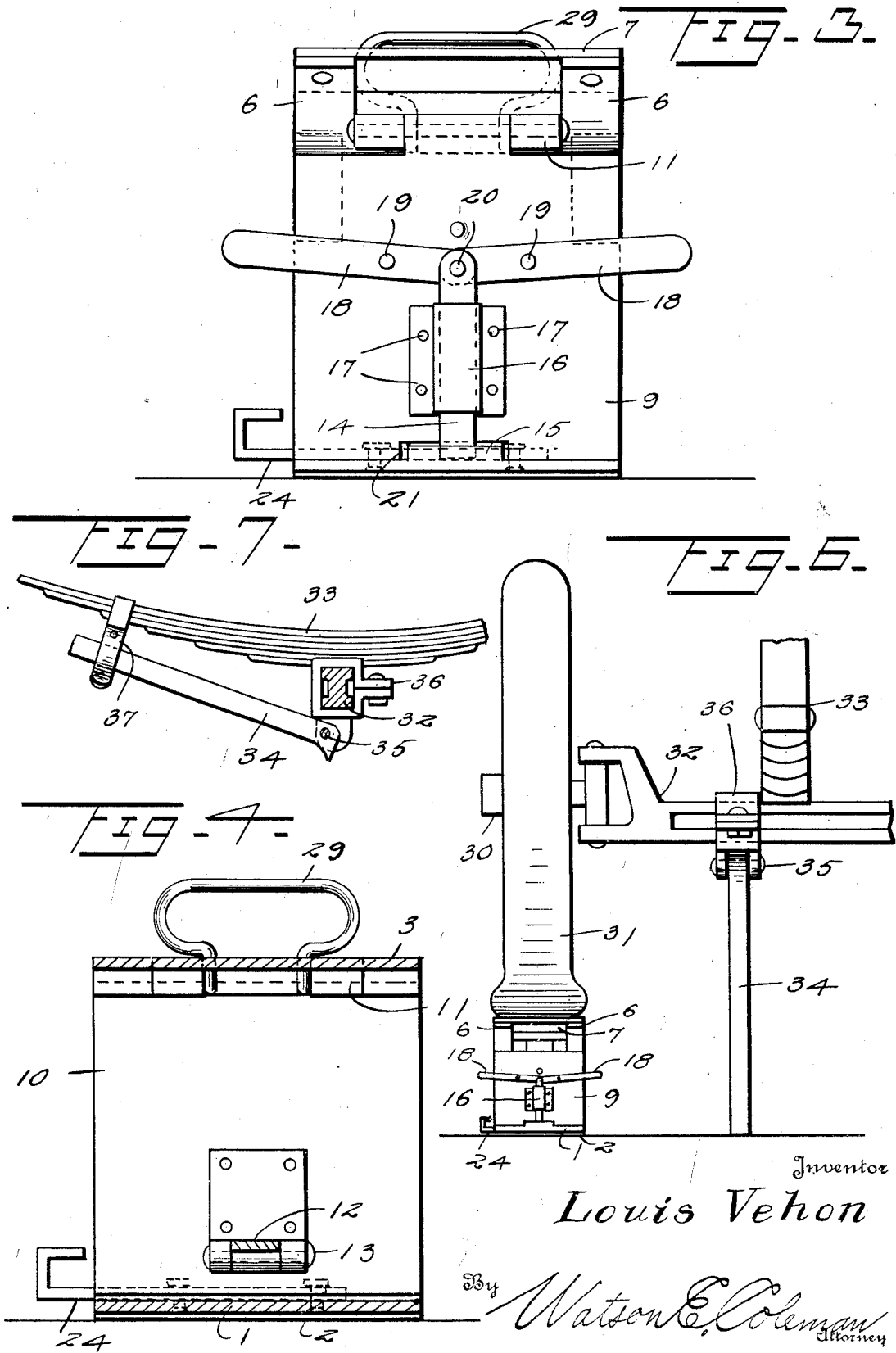

Patented Feb. 10, 1931

1,791,986

UNITED STATES PATENT OFFICE

LOUIS VEHON, OF CHICAGO, ILLINOIS

RUNWAY OR AUTOMOBILE WHEEL ELEVATOR

Application filed September 6, 1929. Serial No. 390,811.

This invention relates to means for elevating an automobile wheel for the purpose of removing therefrom a punctured or otherwise damaged tire and applying thereto the repaired or a fresh tire, and has for one of its objects to provide means of this character which shall be adapted to permit the wheel to be elevated and again lowered to the ground in a comparatively short time and with the expenditure of comparatively little manual effort.

The invention has for a further object to provide means of the character stated which shall be adapted to effect the elevation of the wheel while the automobile is in motion, which shall be adapted after the automobile is stopped to support the wheel while a jack, block or other support is being placed beneath the elevated end of the wheel axle, which shall be adapted after the application of the support to be removed from beneath the wheel so as to permit the axle to be maintained in elevated position by the support and to permit the removal of the damaged tire and the application of the repaired or fresh tire, and which shall be adapted after the application of the repaired or fresh tire to be again used for the purpose of elevating the wheel so as to permit the easy removal of the support.

To attain the foregoing and other objects, the nature of which will appear as the description proceeds, the invention comprehends the provision of a runway upon which the wheel bearing the damaged tire is adapted to be driven, whereby to effect the elevation of the wheel and to maintain it in elevated position until the application of the support.

The invention further comprehends the provision of a runway which shall be adapted to be easily collapsed after the application of the support, whereby to permit its removal from beneath the wheel so as to permit the axle to be maintained in elevated position by the support.

The invention further comprehends the provision of a runway which shall be adapted to be readily extended to permit it to be used to again elevate the wheel whereby to permit the removal of the support, the runway permitting the wheel to be readily withdrawn therefrom after the removal of the support so as to lower the wheel to the ground.

The invention still further comprehends the provision of a runway which shall be simple, strong and durable and capable of being easily and cheaply manufactured.

The invention is hereinafter fully described and claimed, and illustrated in the accompanying drawings:—

Figure 1 is an elevational view illustrating the manner in which the runway is adapted to be used to effect the elevation of an automobile wheel;

Figure 2 is a view partly in top plan and partly in horizontal section of the runway;

Figure 3 is a view in front elevation of the runway;

Figure 4 is a sectional view taken on the planes indicated by the line 4—4 of Figure 1;

Figure 5 is a sectional view taken on a plane extending vertically and transversely through the runway when in collapsed condition;

Figure 6 is an elevational view illustrating the manner in which the runway is adapted to be used to maintain the automobile wheel in elevation during the lowering of a support pivotally connected to the axle; and Figure 7 is a view partly in side elevation and partly in vertical section illustrating the manner in which the support is normally maintained in inoperative position.

The runway comprises a base 1 which is of elongated rectangular formation in plan. The base 1 is provided at its lower side with transverse ribs or cleats 2, which are adapted to hold the runway against accidental movement while in use. A seat 3 is arranged above the front end portion of the base 1, and a track 4 inclines upwardly from the rear end of the base to the rear end of the seat. The seat 3 and the track 4 are formed integrally, and are of elongated rectangular formation in plan. The track 4 is pivotally connected at its rear end to the rear of the base 1, as at 5, so as to permit it and the seat 3 to be raised and lowered with respect to the base. The seat 3 is of arcuate formation in longitudinal section, and the concave side thereof is arranged uppermost. The seat 3 is provided with upwardly and forwardly inclined lugs 6 to which is secured a stop bar 7. The stop bar 7 is located above and slightly forward of the seat 3, and it extends entirely across the seat. The track 4 is provided with a roughened upper surface, and such surface may be formed in any suitable manner, as for instance by providing the track with upwardly extending projections 8.

The seat 3 and track 4 are supported in raised or operative position by props 9 and 10, which are of rectangular formation in elevation. The props 9 and 10 rest at their lower edges upon the base 1 and are pivotally connected at their upper edges, as at 11, to the front and rear edges of the seat 3.

The props 9 and 10 are connected together adjacent their lower edges by a bar 12, which is arranged between the props and pivotally connected at its ends thereto, as at 13.

The props 9 and 10 are releasably maintained in seat and track supporting position by a latch bar 14, which is carried by the front side of the prop 9 and engages an upstanding lug or stop 15 on the front end of the base 1. The latch bar 14 is slidably mounted in a guide 16 secured, as at 17, to the prop 9, and it is supported for upward and downward movement with respect to this prop and the stop 15. The latch bar 14 is adapted to be withdrawn from engagement with the stop 15 through the medium of one of a pair of levers 18. The levers 18 are pivotally connected, as at 19, at points between their ends, and at opposite sides of the upper end of the latch bar 14 to the front side of the prop 9. The inner ends of the levers 18 are pivotally connected, as at 20, to the upper end of the latch bar 14. The outer ends of the levers 18 project beyond the prop 9 at opposite sides of the runway so as to permit one or the other to be conveniently engaged by the foot when it is desired to withdraw the latch bar 14 from engagement with the stop 15.

The prop 9 is provided at its lower edge, and in alinement with the stop 15 with a notch 21, so as to permit it to be swung forwardly beyond the stop after the withdrawal of the latch bar 14 from engagement with the stop. This movement of the prop 9 imparts a corresponding movement to the prop 10, and the props are moved in this direction when it is desired to lower the seat 3 and track 4 on to the base 1.

Stops 22, which are secured, as at 23, to the seat 3 extend downwardly from the seat and serve to limit the downward movement of the seat and track 4 with respect to the base 1. After the seat 3 and track 4 have been lowered into the base 1, the props 9 and 10 will extend forwardly with portions thereof arranged between the seat and base. It will thus be seen that the runway may be compactly folded or collapsed so as to permit it to occupy but comparatively small space within the tool box or beneath the seat of the automobile. The runway is adapted to be secured in collapsed condition by a hook 24, which engages the track 4 and is provided with a shank 25 slidably connected to the base 1 by rivets 26, which are carried by the base and extend through slots 27 in the shank. To permit the runway to be conveniently carried, handles 28 and 29 of looped formation are provided, the former being connected to the pivot 5 and the latter to the pivot 11. When in position for use, the handles 28 and 29 extend upwardly from the track 4, as shown by solid lines in Figure 1. The handle 28 may be swung from its utile position into substantial alinement with the base 1, and the handle 29 may be swung from its utile position against the upper side of the seat 3, as suggested by broken lines in Figure 1, when the runway is in erected or extended condition so as not to interfere with the free movement of the wheel up the track 4 and into the seat 3.

When it is desired to remove a tire from one of the wheels of the automobile, the runway is erected and arranged in alinement with the wheel and with the lower end of the track 4 near the wheel.

The automobile is then set in motion with the result that the wheel moves up the track 4 and into the seat 3. When the wheel reaches the seat 3, the automobile is brought to a stop, with the result that the wheel and the automobile axle will be supported in elevated position. The downward curvature of the seat 3 and the stop bar 7 prevent the wheel from accidentally leaving the seat 3, and the stop bar tends to arrest the motion of the automobile and direct the operator's attention to the fact that the wheels is in the seat. The manner in which the runway is used is illustrated in Figures 1 and 6 wherein 30 designates the wheel, 31 the tire, 32 one of the axles and 33 one of the springs of the automobile.

After the wheel 30 has been elevated, a jack, block or other support is placed beneath the axle 32, and thereafter the runway is collapsed to lower the axle on to the jack, block or other support. If desired, the front axle and rear axle housing may be equipped with supports in the form of bars or legs and connected thereto for movement into operative and inoperative position. One of the bars is shown in Figures 6 and 7 and designated 34. The bar 34 is pivotally connected, as at 35, to a clip 36, which is secured to the axle 32. The bar 34 is normally supported in a raised or inoperative position by a clip 37 which is secured to the spring 33 and releasably engaged with the bar. After the wheel 30 has been elevated through the medium of the runway, the bar 34 is released and permitted to move into a vertical depending or operative position with respect to the axle 32, and thereafter the runway is collapsed so as to lower the bar 34 into engagement with the ground.

To permit the runway to collapse, it is only necessary to step upon one of the levers 18. This results in the withdrawal of the latch bar 14 from engagement with the stop 15, and the withdrawal of the latch bar permits the props 9 and 10 to swing rearwardly under the weight of the wheel. The rearward swinging movement of the props 9 and 10 permits the seat 3 and track 4 to move downwardly on the base 1. To facilitate their rearward swinging movement after the withdrawal of the latch bar 14, the props 9 and 10 extend upwardly and rearwardly from the base 1 when in seat and track supporting position. After the runway has collapsed, it may be removed so as to permit easy access to the wheel and tire, and after the repaired or the fresh tire has been applied to the wheel, the runway is again extended and arranged in alinement with the wheel, and thereafter the car is set in motion to again carry the wheel into the seat 3. This results in the wheel being again elevated, and after this elevation thereof, the jack or block may be readily removed or the bar 34 readily swung into and secured in inoperative position.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A vehicle wheel runway or elevator, comprising a base, a seat arranged above the base, a track inclining upwardly in the direction of the seat, means pivotally connecting the lower end of the track to the base, a prop pivoted to the seat and resting upon the base, a stop carried by the base, and a latch bar slidably mounted upon the prop and engaging the stop to maintain the prop in supporting position.

2. A vehicle wheel runway or elevator comprising a base, a seat arranged above the base, a track inclining upwardly in the direction of the seat, means pivotally connecting the lower end of the track to the base, a prop pivoted to the seat and resting upon the base, a stop carried by the base, a latch bar slidably mounted upon the prop and engaging the stop to maintain the prop in supporting position, and a lever pivoted between its ends to the prop and having one end arranged laterally beyond the prop and the other pivotally connected to the latch bar.

3. A vehicle wheel runway or elevator comprising a base, a seat arranged above the base, a track inclining upwardly in the direction of the seat, means pivotally connecting the lower end of the track to the base, props pivoted to the seat and resting upon the base, a bar arranged between and pivotally connected to the props, a stop carried by the base, a latch bar slidably mounted upon one of the props and engaging the stop to maintain the props in supporting position, and levers pivotally mounted between their ends upon said last prop and having certain of their ends arranged laterally beyond the same and their other ends pivotally connected to the latch bar.

In testimony whereof I hereunto affix my signature.

LOUIS VEHON.